2,994,716
ADDITION PRODUCT OF TETRACYCLINE AND METHANOL AND PROCESS FOR PREPARING IT

Alfons Söder, Kelkheim (Taunus), and Walter Siedel, Bad Soden (Taunus), Germany, assignors to Farbwerke Hoechst Aktiengesellschaft vormals Meister Lucius & Brüning, Frankfurt am Main, Germany, a corporation of Germany
No Drawing. Filed Mar. 12, 1958, Ser. No. 720,837
Claims priority, application Germany Mar. 28, 1957
7 Claims. (Cl. 260—559)

Various processes are known for the purification of crude tetracycline prepared according to known biological methods. Tetracycline can be purified for example by converting crude products of tetracycline into its salts. Tetracycline can, furthermore, be separated from impurities in the form of its metal complex salts. There are also known paper-chromatographic and column-chromatographic purification processes. Attempts have also been made to obtain pure tetracycline from a mixture with chlorotetracycline and oxytetracycline by selective decomposition of the two latter compounds which in a certain pH range are less stable than tetracycline.

However, all these processes show the disadvantage of high losses in substance; furthermore, chlorotetracycline, oxytetracycline and other tetracycline derivatives can in no case be separated completely from tetracycline.

Now we have found that the tetracycline forms with methanol a crystallized addition product which is sparingly soluble in methanol and can therefore easily be separated.

This methanol addition product allows of purifying tetracycline and of separating it from compounds such as epi-tetracycline, anhydro-tetracycline, chlorotetracycline and oxytetracycline. Furthermore the methanol addition product of tetracycline represents not only a highly purified but also an especially stable form of tetracycline which form is stable in light and insensitive against the action of atmospheric oxygen even when stored for a prolonged period of time. In contradistinction thereto free tetracycline with or without water of crystallization undergoes, under the same conditions, discolorations and its microbiological activity decreases.

The product of the present invention has the special advantage that it is decomposed by dissolving it in water whereby tetracycline trihydrate is obtained as well-formed large crystals. When the pure addition product of tetracycline and methanol is decomposed in water at a higher temperature, preferably at 50° C., tetracycline hydrate is obtained in a very pure form which is characterized by rectangular bound yellow platelets.

The tetracycline-methanol addition product can likewise be used for the immediate preparation of salts and other derivatives of tetracycline.

The methanol addition product of tetracycline of this invention is prepared as follows. The antibiotic, for example in the form of its trihydrate or as a crude product as obtained for instance according to known methods by fermentation processes or in an anhydrous form, is dissolved in methanol in a ratio of 1:10 to 1:20, while stirring, at temperatures in the range from −20° C. to +64° C., preferably at +10 to +30° C., and separated from insoluble impurities by filtration.

After some time crystallization of the methanol addition product in the form of weakly yellow thin platelets grown together in tufts sets in. The addition product contains 1 mol of methanol per 1 mol of tetracycline. Methanol can be removed quantitatively at a temperature above 50° C. and under reduced pressure.

The yield of this process amounts to 85–90% of the theoretical and can be further increased when the mother liquor is re-used.

The product obtained by the present process shall preferably be used for purifying and isolating tetracycline from a crude product, for the production of very pure pharmaceutical preparations especially for injection purposes and furthermore as stable addition to foodstuff.

The following examples serve to illustrate the invention, but they are not intended to limit it thereto:

Example 1

500 grams of crude tetracycline (trihydrate) from biological material of the activity of 850 I.U./milligram are introduced at 15° C., while stirring, into 5000 cc. of methanol. Undissolved impurities are separated and the clear solution is stirred for about 6 hours until crystallization of the tetracycline-methanol addition product is complete. The weakly yellow colored addition product is isolated, washed with a small quantity of cold methanol and dried at 20° C. under reduced pressure. Yield: 370 grams (=87% of the used activity). The microbiological test of the addition product shows an activity of 1000 I.U./milligram.

Composition: $C_{23}H_{28}O_9N_2$ (molecular weight: 476.24).
Calculated: C, 57.96; H, 5.93; O, 30.23; N, 5.88. Found: C, 58.11; H, 5.79; O, 30.38; N, 6.02.

Example 2

500 grams of tetracycline (anhydrous) of the activity of 925 I.U./milligram are dissolved at 20° C., while stirring in 5000 cc. of methanol. A small amount of undissolved impurities is removed by filtration. After some time crystallization of the weakly yellow colored tetracycline-methanol addition product sets in and is terminated after approximately 6 hours. The granular crystallized product is isolated and dried at 20° C. under reduced pressure. The yield amounts to 411 grams (=89% of the used activity). The microbiological test of the addition product shows an activity of 1000 I.U./milligram.

We claim:
1. A process which comprises dissolving tetracycline in a molar excess of methanol and maintaining the resulting solution at a temperature in the range of about −20° C. to +64° C. until precipitation of a methanol-tetracycline addition product is complete.
2. A process as defined in claim 1 wherein the relative proportions of tetracycline and methanol are between about 1:10 and 1:20.
3. A method as defined in claim 1 wherein the tetracycline and methanol are maintained at a temperature in the range of about +10 to +30° C.
4. A method as defined in claim 1 wherein the tetracycline is anhydrous.
5. A method as defined in claim 1 wherein the tetracycline is in the form of its hydrate.
6. A method as defined in claim 1 wherein the tetracycline is in the form of a crude product thereof obtained by biological fermentation.

7. A solid addition product of equimolar proportions of tetracycline and methanol prepared by dissolving one part by weight of tetracycline in about ten to twenty parts by weight of methanol at a temperature in the range of about −20° C. to +64° C. and maintaining said solution within said range of temperature until said addition product precipitates.

References Cited in the file of this patent

UNITED STATES PATENTS

| | | |
|---|---|---|
| 2,699,054 | Conover | Jan. 11, 1955 |
| 2,847,471 | Vandeputte et al. | Aug. 12, 1958 |

FOREIGN PATENTS

| | | |
|---|---|---|
| 167,750 | Australia | May 25, 1956 |
| 530,635 | Belgium | July 23, 1954 |
| 538,487 | Belgium | May 26, 1955 |
| 3169/57 | South Africa | July 22, 1958 |

OTHER REFERENCES

Gailliot et al.: "Compt. Rend., 270 Cong. Intern. Chim. Ind." (Brussels, vol. 3), pp. 506–8, published Sept. 11, 1954.

Doerschuk et al.: J.A.C.S., vol. 77, p. 4687, Sept. 5, 1955.